US012344003B2

(12) United States Patent
Rummelsberger et al.

(10) Patent No.: US 12,344,003 B2
(45) Date of Patent: Jul. 1, 2025

(54) DEVICE, INK PRINTING SYSTEM, AND METHOD FOR DETERMINING AN EMPTY INK STATE OF AN INK CONTAINER

(71) Applicant: Canon Production Printing Holding B.V., Venlo (NL)

(72) Inventors: Christoph Rummelsberger, Ismaning (DE); Florian Hitzlsperger, Poing (DE); Ulrich Stöckle, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 251 days.

(21) Appl. No.: 18/211,832

(22) Filed: Jun. 20, 2023

(65) Prior Publication Data

US 2023/0405999 A1 Dec. 21, 2023

(30) Foreign Application Priority Data

Jun. 21, 2022 (DE) ...................... 10 2022 115 378.9

(51) Int. Cl.
*B41J 2/175* (2006.01)

(52) U.S. Cl.
CPC ....... *B41J 2/17566* (2013.01); *B41J 2/17513* (2013.01); *B41J 2/17596* (2013.01); *B41J 2002/17516* (2013.01)

(58) Field of Classification Search
CPC .... B41J 2/175; B41J 2/17506; B41J 2/17509; B41J 2/17513; B41J 2/17523; B41J 2/17553; B41J 2/17566; B41J 2/17596; B41J 29/13; B41J 2002/17516; B41J 2002/17579; G01F 22/02; G01F 23/18
See application file for complete search history.

(56) References Cited

U.S. PATENT DOCUMENTS

| 6,227,638 B1 * | 5/2001 | Childers | .............. B41J 2/17566 347/7 |
| 6,322,205 B1 * | 11/2001 | Childers | .............. B41J 2/17596 347/85 |

FOREIGN PATENT DOCUMENTS

| EP | 1375161 B1 | 9/2008 |
| EP | 1375162 B1 | 9/2008 |
| EP | 2958750 B1 | 5/2018 |
| JP | H04347653 A | 12/1992 |

\* cited by examiner

*Primary Examiner* — Anh T Vo
(74) *Attorney, Agent, or Firm* — The Webb Law Firm

(57) ABSTRACT

Provided is a device for determining an empty ink state of an ink container for an ink printing system. The ink container has a rigid outer container and an inner, flexible fluid pouch. The inner fluid pouch is connected via a fluid conduit to a pump that is configured to convey fluid out of the inner fluid pouch. The pump is configured to output an electrical signal whose periodicity is proportional to a rotational speed of the pump. The device has an evaluation unit that is configured to monitor the frequency of the electrical signal and, upon the frequency falling below a predetermined threshold, to output that the ink container is empty.

15 Claims, 8 Drawing Sheets

DEVICE, INK PRINTING SYSTEM, AND METHOD FOR DETERMINING AN EMPTY INK STATE OF AN INK CONTAINER

CROSS-REFERENCE TO RELATED APPLICATION

This application claims priority to German Patent Application No. 10 2022 115 378.9 filed Jun. 21, 2022, the disclosure of which is hereby incorporated by reference in its entirety.

BACKGROUND OF THE INVENTION

Field of the Invention

The present invention relates to a device, an ink printing system, and a method for determining an empty ink state of an ink container, wherein the ink container has a rigid outer container and an inner, flexible fluid pouch.

Description of Related Art

Ink containers with a rigid outer container and an inner, flexible fluid pouch are known from, for example, EP 1 375 161 B1, EP 1 375 162 B1, and EP 2 958 750 B1.

In operation, the ink supply from the ink container is achieved in that ink is drawn by a pump from the ink container, and/or in that air is puffed into the space within the rigid outer container, but outside of the flexible fluid pouch, so that the pouch implodes and thus the ink is expressed.

Such ink containers with rigid outer container and inner, flexible fluid pouch have the advantage that the inner fluid pouch can be designed without air or other gases. In this way, it can be ensured that ink that is conveyed from the fluid pouch can be supplied to a printing device without mixing with air or other gases, as well as without ink leaks. At the same time, due to the rigid outer container it can be achieved that the ink container can be exchanged simply in a modular manner. These advantages are, for example, described in the publication JP—H04 347653.

It is a disadvantage of such fluid pouches that a fill level cannot be measured with conventional fill level sensors. Given that the fluid pouch implodes as it increasingly empties, a vertical fill level has little significance. The remaining ink volume is not proportional to the fill level.

SUMMARY OF THE INVENTION

It is an object of the invention to mitigate or entirely remedy the problems of the prior art.

According to the invention, given a device for determining an empty ink state of an ink container for an ink printing system, the inner fluid pouch is connected to a pump via a fluid conduit. This is configured to convey fluid out of the inner fluid pouch. The pump is hereby configured to output an electrical signal whose periodicity is proportional to a rotational speed of the pump. The device has an evaluation unit that is configured to monitor the frequency of the electrical signal.

The inner fluid pouch has the property that, when the fluid pouch is nearly empty and additional fluid is pumped out of the fluid pouch by means of the pump, in this event a "pump resistance" appears in the fluid pouch that counteracts a further emptying of said fluid pouch. Given consistent pump performance, the pump thus slows. The frequency of the electrical signal also decreases with this slowing. If the frequency falls below a predetermined threshold, this is thus a measure of an emptying of the fluid pouch. According to the invention, the evaluation unit outputs falling below the predetermined threshold as an empty ink state.

In an advantageous embodiment, the predetermined threshold is less than 80%, more preferably less than 60%, even more preferably between 45% and 55% of the frequency given a full ink container. This is advantageous since a nearly complete emptying can be determined in this way.

The evaluation unit is expediently configured to output that the ink container is empty only when the frequency falls below the predetermined threshold for at least a predetermined minimum duration. This is advantageous since, in this way, short-term fluctuations of the pump speed cannot lead to an incorrect empty state indication.

The frequency of the electrical signal is preferably between 120 Hz and 200 Hz, more preferably between 140 Hz and 180 Hz. These are typical tacho frequencies of commercially available gear pumps. It is thereby conceivable that the electrical signal has the form of a square wave pulse, wherein in particular a rising edge occurs at every fourth rotation of gearwheel in the pump. This is a robust solution that is, however, to be understood as non-limiting.

According to further aspects according to the invention, an ink printing system is proposed having at least one device according to the invention, at least one gear pump, at least one ink container, and at least one print head unit that is configured to be supplied with ink via the pump.

Moreover, a method is proposed for determining an empty ink state of an ink container for an ink printing system, in particular by means of a device according to the invention, wherein the ink container has a rigid outer container and an inner, flexible fluid pouch, wherein the inner fluid pouch is connected via a fluid conduit to a pump which is configured to convey fluid out of the inner fluid pouch, comprising the following steps:

output, via the gear pump, an electrical signal whose periodicity is proportional to a rotational speed of the pump;

monitor a frequency of the electrical signal via an evaluation unit;

upon the frequency of the electrical signal falling below a predetermined threshold, the evaluation unit outputs that the ink container is empty.

Further advantages and embodiments of the present invention are described in detail using the following drawings.

DESCRIPTION OF THE INVENTION

Figure 1:
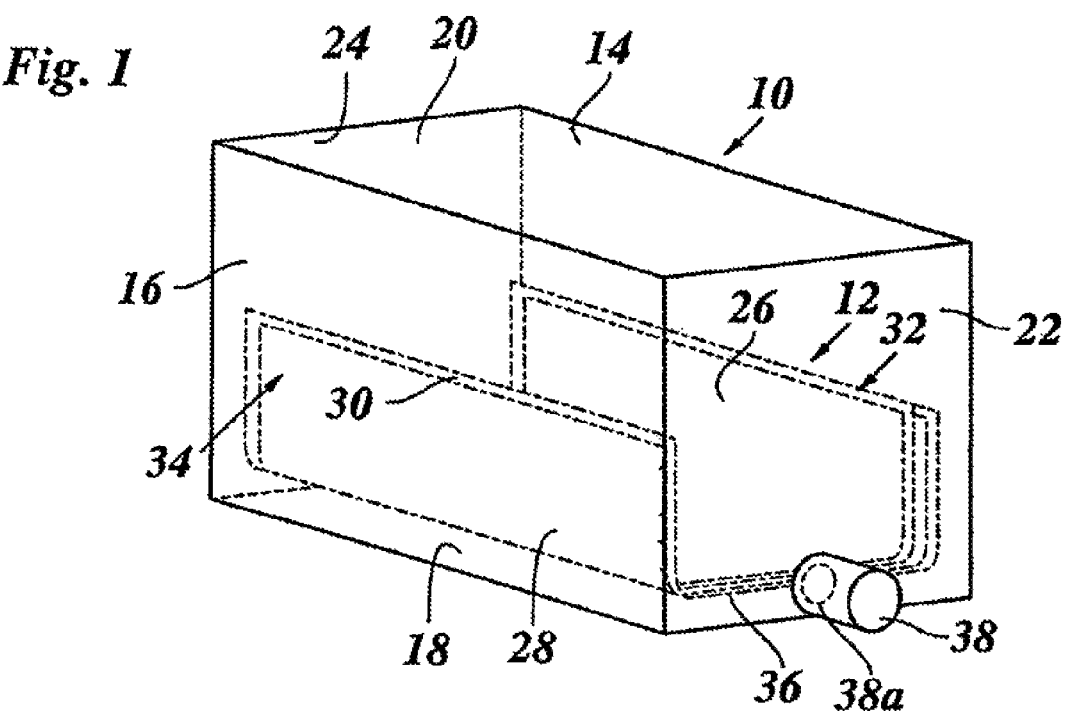
FIG. 1 shows an ink container with empty fluid pouch for a non-limiting embodiment of an ink printing system according to the invention.

The ink container in FIG. 1 has an outer container 10 made of plastic (and/or cardboard) and a fluid pouch 12 that can conform to the outer container 10. In the shown embodiment, the outer container essentially has the shape of a parallelepiped that has the side walls 16, a floor wall 18 as well as an upper wall 20, a front wall 22, and a rear wall 24. The fluid pouch 12 has an upper wall 26 as well as a floor wall 28 that are formed by means of flexible laminated films that are joined, for example via welded seals 30. In FIG. 1, the fluid pouch in a film-like state is imploded and conformed to the outer container in a U-shaped configuration, with side segments 32, 34 of the fluid pouch curved upward and supported by the side walls 14, 16 of the outer container. A front edge 36 of the fluid pouch 12 is connected in a fluid-tight manner with a front wall of the fluid pouch via an opening 38a. Since the middle segment of the fluid pouch rests on the floor wall 18 of the outer container the outflow 38 penetrates the front wall 22 of the outer container in a position near the floor wall 18.

The width of the fluid pouch 12—for example the width of the upper and floor walls 26, 28, measured along the front edge 36—can be greater than the width of the outer container 10, and corresponds approximately to the sum of the width and the height of the outer container 10. As a result, the side segments 32, 34 of the fluid pouch that are curved upward reach a level that corresponds approximately to half of the height of the outer container 10.

Figure 2:
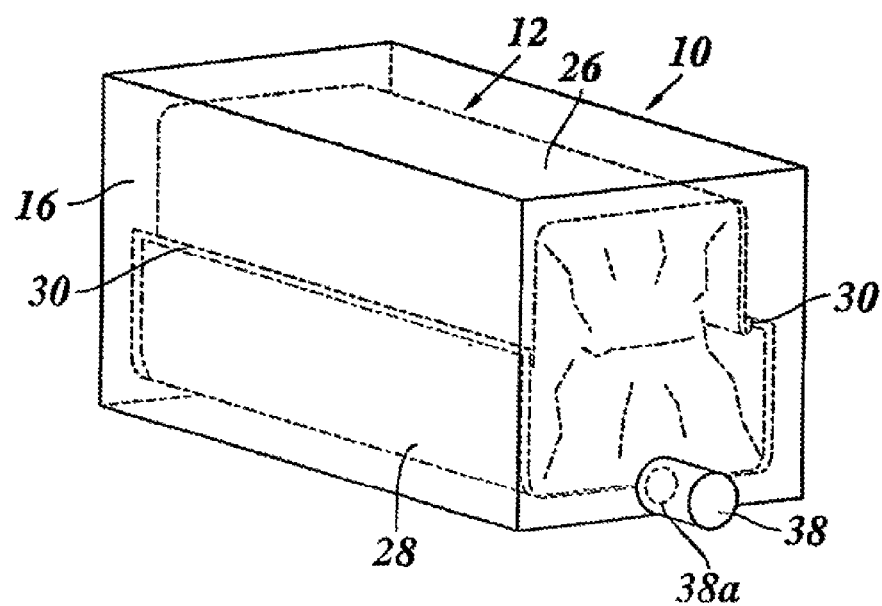
FIG. 2 shows the ink container from FIG. 1 with filled fluid pouch, in an oblique view.

If liquid ink in the fluid pouch 12 is supplied through the outflow 38, for example in order to fill the ink container for customers, the fluid pouch 12 expands into an approximately cylindrical or box-like configuration. This is achieved by an upward movement of the upper wall 26, which then assumes an upwardly convex shape. As a result, the fluid pouch 12 nearly completely fills the inside of the outer container 10, as shown in FIG. 2. Only sealing segments 30 wherein the supper wall 26 and the lower wall 28 of the fluid pouch are joined are preserved in an upwardly curved configuration, since they are pressed against the side walls 14, 16 by the pressure of the fluid in the fluid pouch. The outer container must be accordingly ventilated so that air can escape from the inside of the outer container when the fluid pouch 12 is filled. Contrary to this, when ink flows out of the fluid pouch via the outflow 38, the fluid pouch 12 will collapse again and air will penetrate into the volume within the outer container 10 which is no longer occupied by the fluid pouch. When the fluid pouch 12 collapses, the upper wall 26 moves downward and again achieves an upwardly directed concave shape (depicted in FIG. 1) in order to ultimately match the U-shape of the floor wall 28 again when the fluid pouch is significantly emptied, in particular completely emptied. Since the outflow 38 is arranged at the lowest possible position, near the floor of the outer container, the ink in the fluid pouch 12 is allowed to gently flow out under its own weight. If the fluid pouch 12 collapses completely, virtually no ink remains in the fluid pouch.

Figure 3:
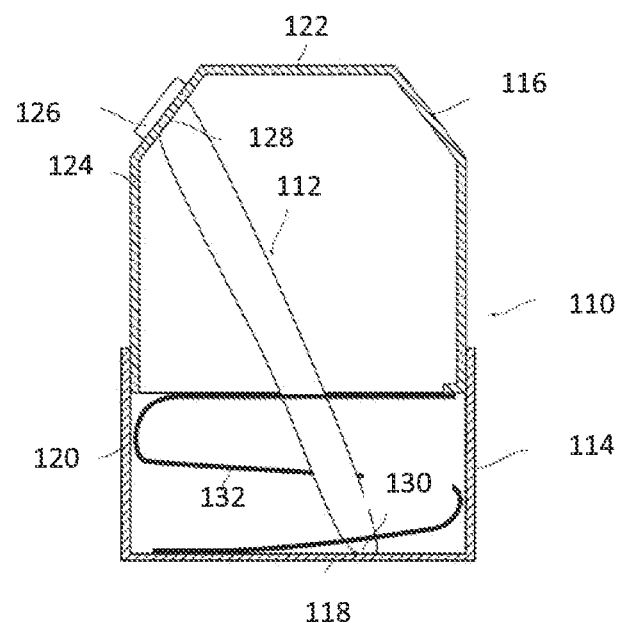
FIG. 3 shows a further ink container with empty fluid pouch for a further non-limiting embodiment of an ink printing system according to the invention, in cross section through the fluid pouch.
Figure 4:
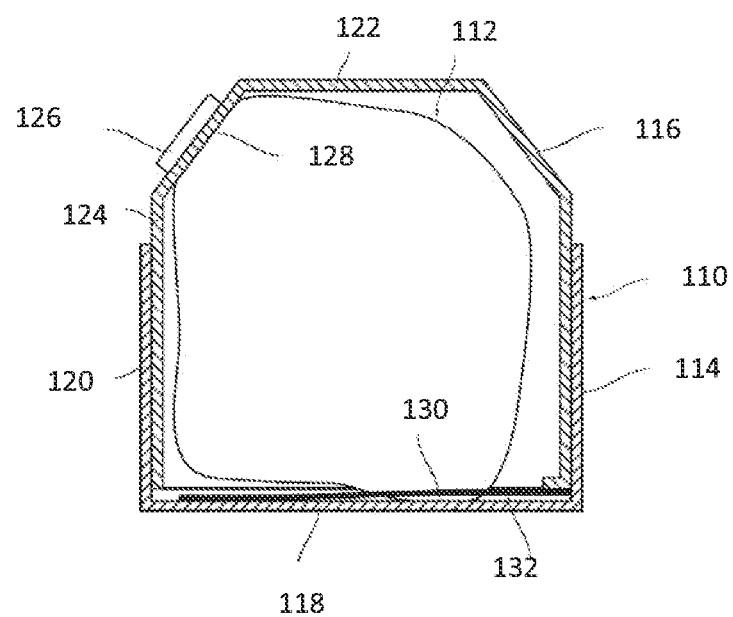
FIG. 4 shows the ink container from FIG. 3 with a full fluid pouch.

FIGS. 3 and 4 show a different ink container in a different embodiment.

The ink containers from FIGS. 3 and 4 have a rigid outer container 110 that forms an outer contour for the flexible fluid pouch 112. The fluid pouch 112 is filled with a fluid, for example with fluid ink, a maintenance fluid, or a pretreatment fluid for an ink printing system.

The outer container 110 has two components 114, 116 that can be moved telescopically relative to one another. The floor component 114 has a floor wall 118 and side walls 120. The upper component 116 has an upper wall 122, in the manner of a ceiling, and side walls 118 that are held in sliding engagement with the internal surfaces of the side walls 120 of the floor component 114, so that the upper component 116 is guided relative to the floor component 114 for a vertical movement. An outflow 126 via which the fluid that is contained in the fluid pouch 112 can be removed or emptied is installed in the upper wall 122 of the upper component 116, and a first end 128 of the fluid pouch 122 is connected fluid-tight with the outflow 126 and is firmly held in this way in the upper wall 122 of the upper component 116. An opposite second component 130 of the fluid pouch 112 is fastened at the floor wall 118 of the floor component 114.

An elastic part 132 is provided in order to hold the two components 114, 116 of the outer container 110 apart, i.e. in order to push the upper component 114 upward relative to the floor component 114, as is depicted in FIG. 3. In the shown example, the elastic part assumes the shape of a coil spring whose windings extend along the side walls 120 of the component 114 so that a relatively large cavity extends within the spring (see FIG. 3), which allows the fluid pouch 112 to be fastened at the floor wall 118.

A lower end of the elastic part 132 is supported in the floor wall 118, wherein the upper end is supported at the lower edge of the side walls 124 of the upper component 116.

FIG. 4 shows the ink container 110 with a full fluid pouch.

The elastic part 132 is thereby compressed into a flat state in which the volume is great enough in order to accommodate the fluid, and accordingly the distance between the first and second end 128, 130 is relatively short. Since the ends of the fluid pouch are fastened to the components 114 and 116, the fluid pouch exerts a force on the two components 114, 116 of the outer container. Here the elastic part 132 is under tension, so that the two components 114 and 116 should be pushed apart. If this occurs, the fluid pouch generates a pressure, so that the fluid located there wants to flow out of the opening 126, counter to the force of gravity.

Figure 5:
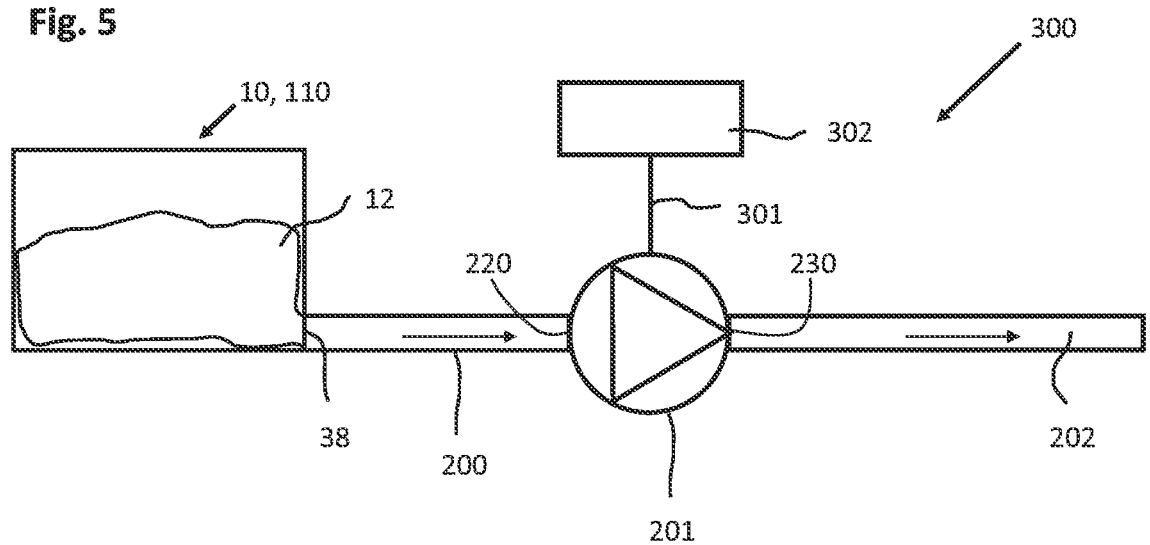
FIG. 5 shows a schematic cross section from an ink printing system according to a non-limiting embodiment of the invention.

FIG. 5 shows a schematic detail of a non-limiting embodiment of an ink printing system according to the invention.

The ink printing system 300 comprises at least one ink container 10 or 110 with an inner fluid pouch 12, a pump 201 with an ink inlet 210, and an ink outlet 220. Moreover, the pump 201 can be designed as a gear pump (sub-type of a positive displacement pump). The ink printing system 300 further comprises an evaluation unit 302 that is electrically connected with the pump 201 via a signal line 301. The pump 201 can emit an electrical signal whose periodicity can be proportional to its rotational speed. This signal is transmitted to the evaluation unit 302 via the line 301.

The inner fluid pouch 12 has an outlet 38 that is in fluidic communication with the pump 201 via a first fluid line 200. The one end of the first fluid line 200 is thereby connected to the outlet 38, and the other end of the first fluid line is connected to the first ink inlet 210 of the pump 201. The second fluid line 202 is connected to the ink outlet 220 of the pump 202 in order to therefrom supply the print heads with ink.

Figure 6:
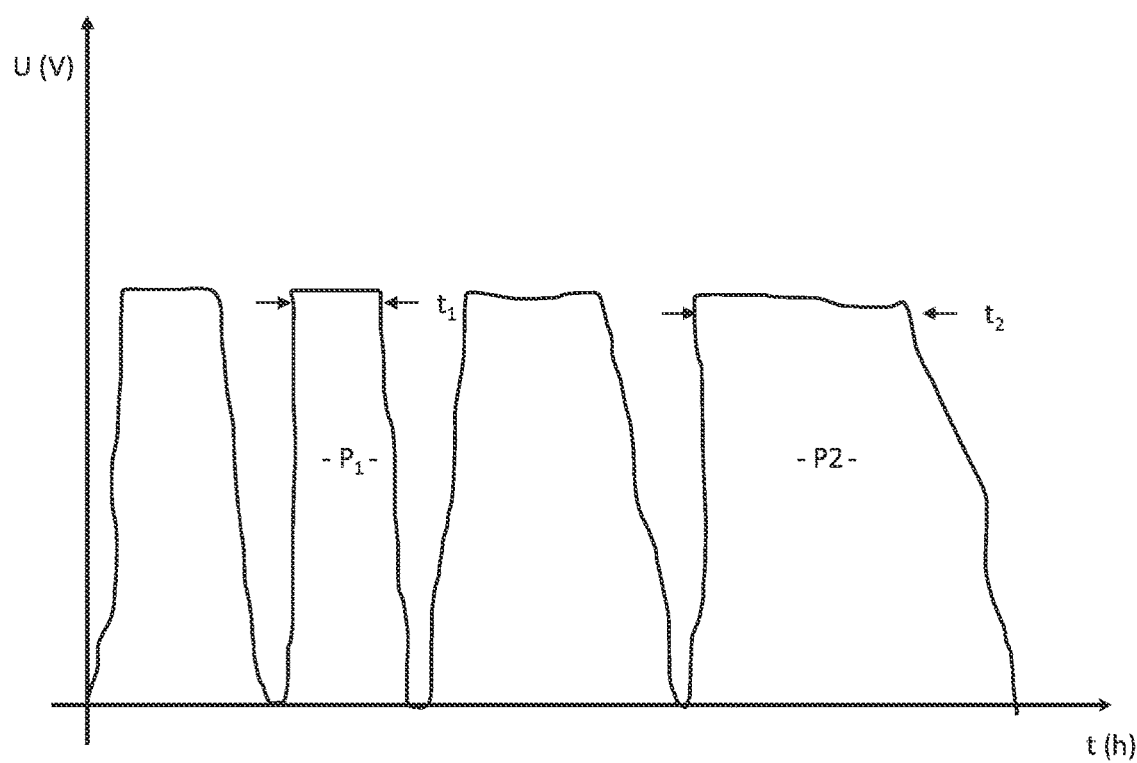
FIG. 6 shows an example of a possible tacho signal from a pump.
Figure 7:
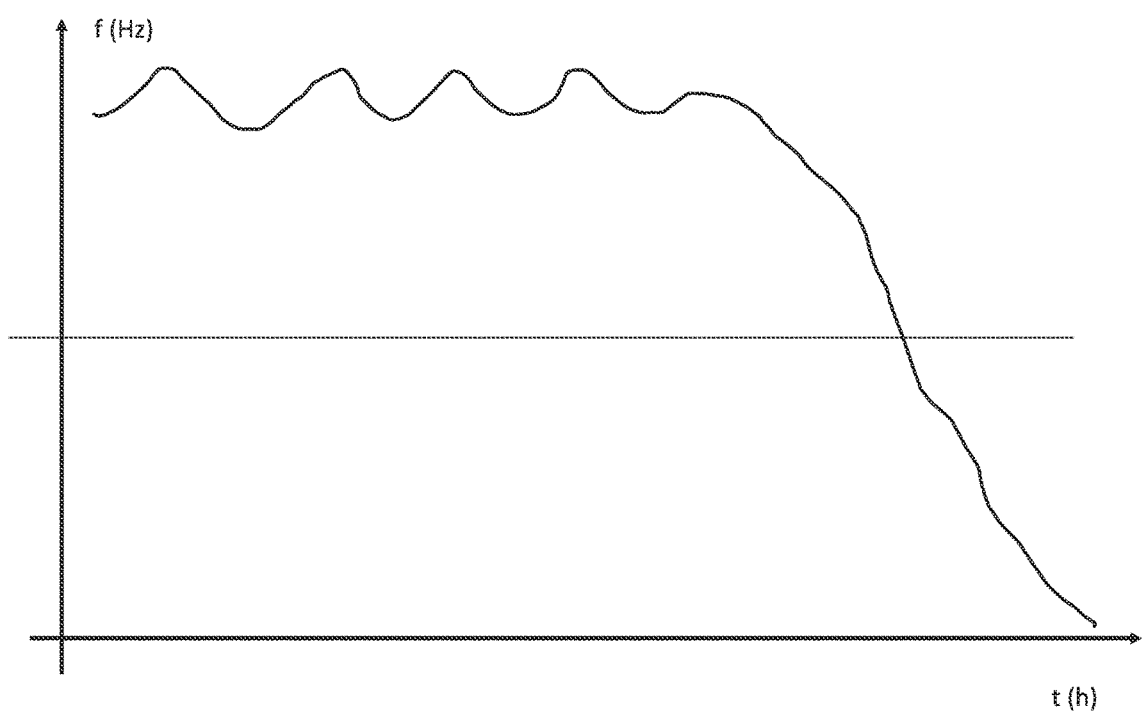
FIG. 7 shows a frequency curve of the tacho signal from FIG. 6.

A non-limiting embodiment of a method according to the invention for determining an empty ink state of an ink container is now described using FIGS. 5 through 7.

An example of a voltage/time diagram of the electrical signal of the pump 201 is depicted in FIG. 6.

The frequency of the electrical signal of the pump 201 is preferably between 120 Hz and 200 Hz, more preferably between 140 Hz and 180 Hz. These are typical tacho frequencies of commercially available gear pumps 201. It is thereby conceivable that the electrical signal has the form of a square wave pulse, wherein a rising edge in particular occurs at every fourth rotation of a gearwheel in the pump. This is presented in FIG. 6. It is visible that the square wave pulse $P_1$ at the point in time $t_1$ is shorter than the square wave pulse at the later point in time $t_2$. The period duration t of a square wave pulse P thus increases with time, which is a measure of the empty state of the fluid pouch 12. It is apparent in FIG. 6 that the frequency is initially subjected to periodic fluctuations that travel around a mean frequency, while the frequency value drops to half and even further upon reaching a certain empty ink state.

The inner fluid pouch 12 has the property that, when the fluid pouch is nearly empty and additional fluid is pumped out of the fluid pouch by means of the pump, in this event a "pump resistance" is created in the fluid pouch, which pump resistance counteracts a further emptying of the fluid pouch. This is what is represented by the curves in FIGS. 6 and 7.

The pump 201 thus slows given the same pump performance. The frequency of the electrical signal also decreases with this slowing. The frequency falling below a predetermined threshold is thus a measure of an emptying of the fluid pouch. According to the invention, the evaluation unit outputs falling below the predetermined threshold as an empty ink state.

In an advantageous embodiment, the predetermined threshold is less than 80%, more preferably less than 60&, even more preferably between 45% and 55% of the frequency given a full ink container. This is advantageous, since in this way a nearly complete emptying can be determined.

The evaluation unit is expediently configured to output that the ink container is empty only when the frequency falls below the predetermined threshold for at least a predetermined minimum duration. This is advantageous, since short-term fluctuations of the pump speed cannot in this way lead to an incorrect empty state indication.

Figure 8:
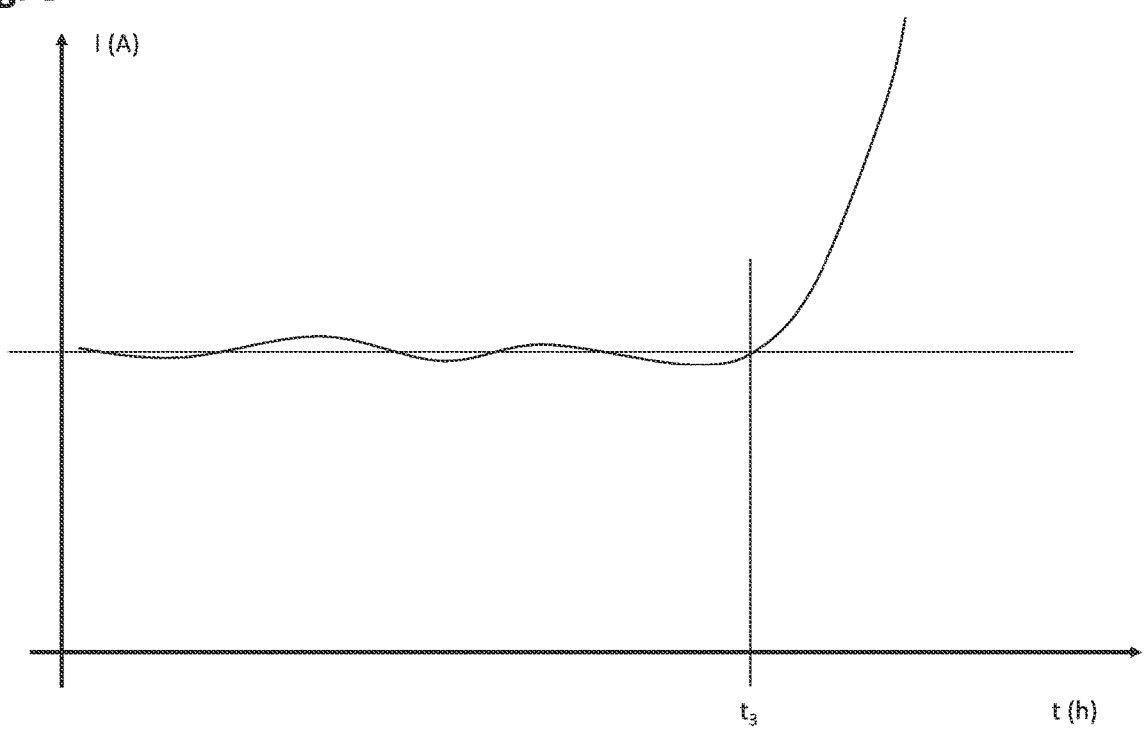
FIG. 8 shows the power consumption of the pump from FIGS. 6 and 7.

An example of a current/time diagram of the electrical signal of the pump 201 is depicted in FIG. 8.

FIG. 8 shows the power consumption of the pump 201, which is preferably constant as long as the flow resistance does not change. If only the ink pouch 12 is empty at the point in time $t_3$, the resistance increases, since no fluid can flow from the pouch 12. The pump 201 builds up a negative pressure in the first conduit 200 and in the ink container 10 or 110, which demands an additional performance of the electric pump 201. This has the result that the power consumption of the pump 201 increases accordingly as of the point in time $t_3$.

REFERENCE LIST 10 outer container
12 fluid pouch
14 side wall
16 side wall
18 floor wall
20 upper wall
22 front wall
24 rear wall
26 upper wall
28 lower wall
30 welded seal
32 side segment
34 side segment
36 front edge
38a opening
38 outflow, outlet
110 rigid outer container
112 flexible fluid pouch
114 floor component
116 upper component
118 side wall
122 upper wall
124 side wall
126 outflow
128 first end
130 second component, second end
132 elastic part
200 fluid conduit
201 pump
202 fluid conduit
210 ink entrance
220 ink exit
230 ink exit
300 ink printing system
301 signal line
302 evaluation unit
P1 square wave pulse
t1 point in time
t2 point in time
t3 point in time
t period duration
P square wave pulse

The invention claimed is:

1. A device for determining an empty ink state of an ink container for an ink printing system, wherein the ink container has a rigid outer container and an inner, flexible fluid pouch, the device comprising:
   a fluid conduit connected to the inner fluid pouch;
   a pump connected to the inner fluid pouch via the fluid conduit, the pump configured to convey fluid out of the inner fluid pouch; and
   an evaluation unit operatively connected to the pump,
   wherein the pump is configured to output an electrical signal whose periodicity is proportional to a rotational speed of the pump, and
   wherein the evaluation unit is configured to monitor a frequency of the electrical signal and, upon the frequency falling below a predetermined threshold, to output that the ink container is empty.

2. The device according to claim 1, wherein the predetermined threshold is less than 80% of the frequency given a full ink container.

3. The device according to claim 1, wherein the evaluation unit is configured to output that the ink container is empty only when the frequency falls below the predetermined threshold for at least a predetermined minimum duration.

4. The device according to claim 1, wherein the frequency of the electrical signal is between 120 Hz and 200 Hz, more preferably 140 Hz and 180 Hz.

5. The device according to claim 1, wherein the electrical signal has the shape of a square wave pulse, wherein in particular the rising edge occurs at every fourth rotation of a gearwheel in the pump.

6. The device according to claim 5, wherein a rising edge of the square wave pulse occurs at every fourth rotation of a gearwheel in the pump.

7. An ink printing system comprising:
- at least one device according to claim 1;
- at least one ink container; and
- at least one print head unit that is configured to be supplied with ink by the pump.

8. The device according to claim 1, wherein the predetermined threshold is less than 60% of the frequency given a full ink container.

9. The device according to claim 1, wherein the predetermined threshold is between 45% and 55% of the frequency given a full ink container.

10. The device according to claim 1, wherein the frequency of the electrical signal is between 140 Hz and 180 Hz.

11. A method for determining an empty ink state of an ink container for an ink printing system, wherein the ink container has a rigid outer container and an inner, flexible fluid pouch; wherein the inner fluid pouch is connected via a fluid conduit to a pump that is configured to convey fluid out of the inner fluid pouch, the method comprising:

outputting, via the gear pump, an electrical signal whose periodicity is proportional to a rotational speed of the pump;

monitoring a frequency of the electrical signal via an evaluation unit;

upon the frequency of the electrical signal falling below a predetermined threshold, outputting via the evaluation unit that the ink container is empty.

12. The method according to claim 11, wherein the predetermined threshold is less than 80% of the frequency given a full ink container.

13. The method according to claim 11, wherein it is output that the ink container is empty only when the frequency falls below the predetermined threshold for at least a predetermined minimum duration.

14. The method according to claim 11, wherein the predetermined threshold is less than 60% of the frequency given a full ink container.

15. The method according to claim 11, wherein the predetermined threshold is between 45% and 55% of the frequency given a full ink container.

* * * * *